(12) United States Patent
Barbier et al.

(10) Patent No.: US 6,237,990 B1
(45) Date of Patent: *May 29, 2001

(54) SUPPORT PIECE FOR BODYWORK ELEMENTS

(75) Inventors: Pascal Barbier, Langres; Hugues Cheron, Paris; Jean-Luc Felgeirolle, Oyonnax, all of (FR)

(73) Assignee: Compagnie Plastic Omnium, Lyons (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,359

(22) Filed: Oct. 2, 1997

(30) Foreign Application Priority Data

Oct. 4, 1996 (FR) .................................................. 96 12147

(51) Int. Cl.⁷ ...................................................... B60R 5/00
(52) U.S. Cl. .................... 296/187; 296/193; 296/203.01; 296/37.1; 296/901
(58) Field of Search ..................................... 296/187, 193, 296/194, 198, 203.01, 203.02, 901, 37.1

(56) References Cited

U.S. PATENT DOCUMENTS

| | | | |
|---|---|---|---|
| 2,973,220 | * 2/1961 | White | 296/31 |
| 4,914,802 | 4/1990 | Takao et al. | |
| 4,973,102 | * 11/1990 | Bien | 296/187 |
| 4,988,144 | * 1/1991 | Johnson et al. | 296/192 |
| 5,077,885 | 1/1992 | Kanemitsu et al. | |
| 5,271,473 | 12/1993 | Ikeda et al. | |
| 5,409,288 | * 4/1995 | Masuda | 296/194 |
| 5,466,033 | * 11/1995 | Murakami et al. | 296/189 |
| 5,580,122 | * 12/1996 | Muehlhausen | 296/194 |
| 5,658,041 | * 8/1997 | Girardot et al. | 296/194 |
| 5,934,745 | * 8/1999 | Moore et al. | 296/197 |

FOREIGN PATENT DOCUMENTS

| | | |
|---|---|---|
| 43 36 030 C1 | 10/1993 | (DE) . |
| 198 10 864 A1 | 9/1998 | (DE) . |
| 299 16 016 U1 | 11/1999 | (DE) . |
| 0 178 266 A1 | 4/1986 | (EP) . |
| 0494562 | * 12/1991 | (EP) . |
| A1 0-494562 | 7/1992 | (EP) . |
| 0 658 470 A1 | 6/1995 | (EP) . |
| 0 908 375 A1 | 4/1999 | (EP) . |
| 0 937 611 A1 | 8/1999 | (EP) . |
| 2 599 698 | 12/1987 | (FR) . |
| 2655605 | * 12/1989 | (FR) . |
| 2 655 605 | 6/1991 | (FR) . |
| A1 2-655605 | 6/1991 | (FR) . |
| 2 761 331 | 10/1998 | (FR) . |
| 58-30874 | 2/1983 | (JP) . |
| 63-103771 | 5/1988 | (JP) . |
| 3-279084 | 12/1991 | (JP) . |
| 3-284433 | 12/1991 | (JP) . |
| 3-213473 | 1/1992 | (JP) . |
| 4-063774 | 2/1992 | (JP) . |
| 5-105115 | * 4/1993 | (JP) . |
| 6-286657 | 10/1994 | (JP) . |
| 7-069242 | 3/1995 | (JP) . |
| 7-069243 | 3/1995 | (JP) . |
| WO 82/00808 | 3/1982 | (WO) . |
| WO 99/54187 | 10/1999 | (WO) . |

* cited by examiner

Primary Examiner—Joseph D. Pape
Assistant Examiner—Mickki D Murray
(74) Attorney, Agent, or Firm—Oliff & Berridge, PLC

(57) ABSTRACT

A support piece for bodywork elements is fixed to the chassis of a motor vehicle and placed beside a compartment of the motor vehicle and includes, adjacent to the bodywork elements, a reinforced structure whose envelope matching substantially the inside shapes of the bodywork elements for supporting the bodywork elements, and adjacent to the compartment, arrangements for receiving items that are housed inside the compartment.

21 Claims, 11 Drawing Sheets

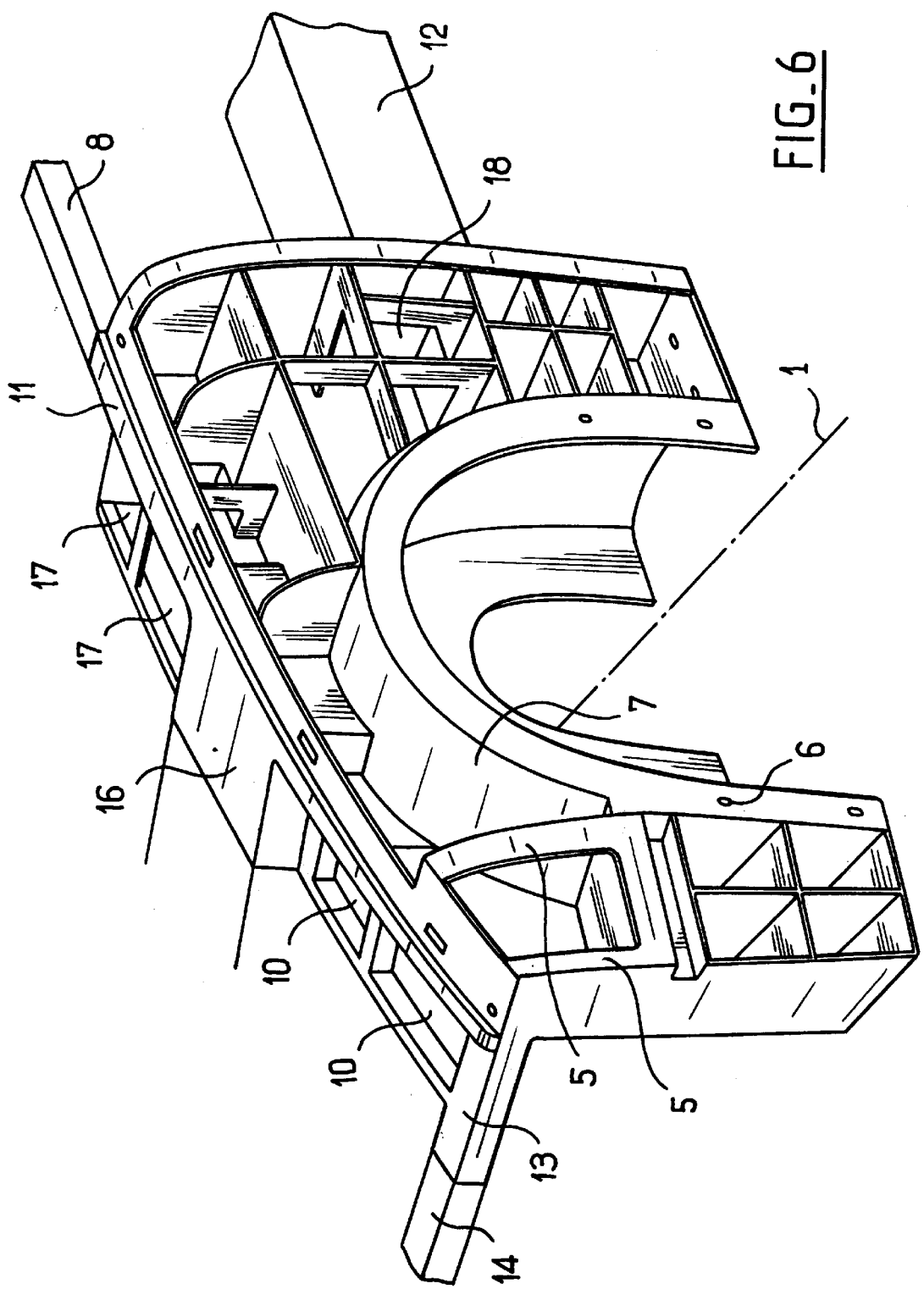
FIG._6

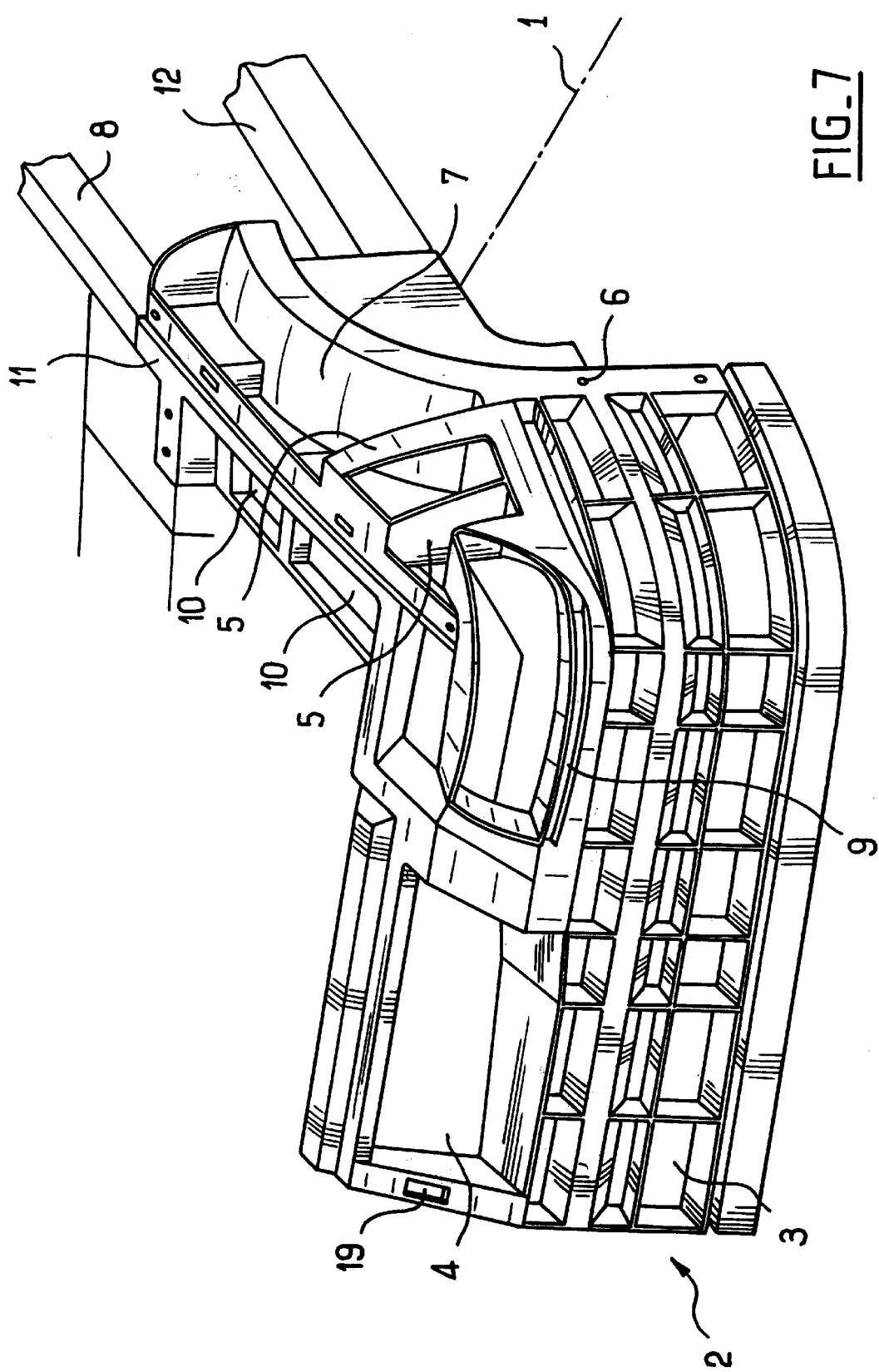
FIG_7

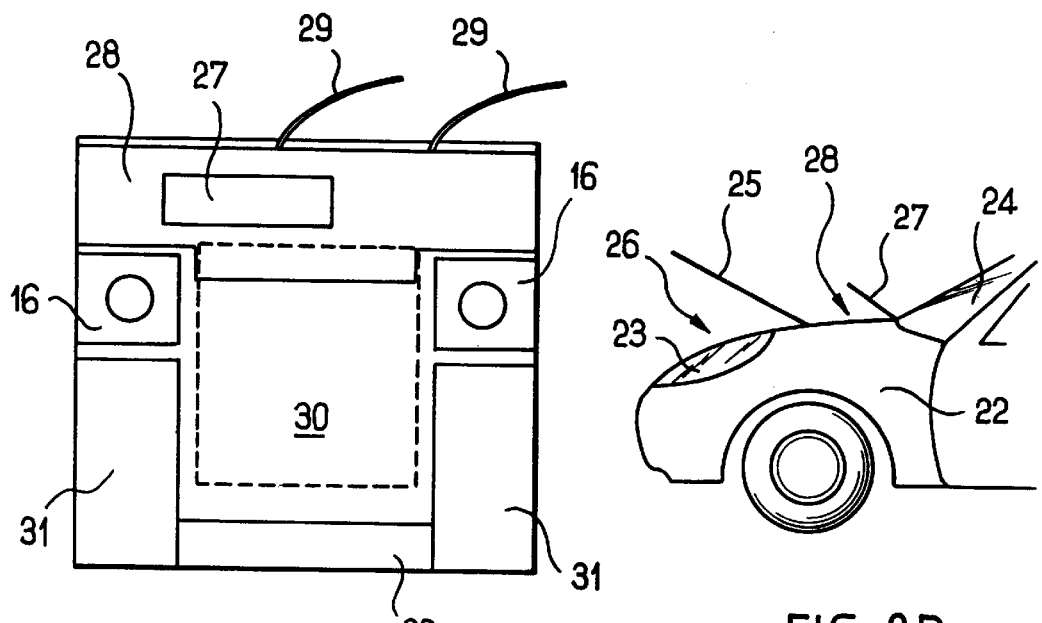
FIG_8A
FIG_8B
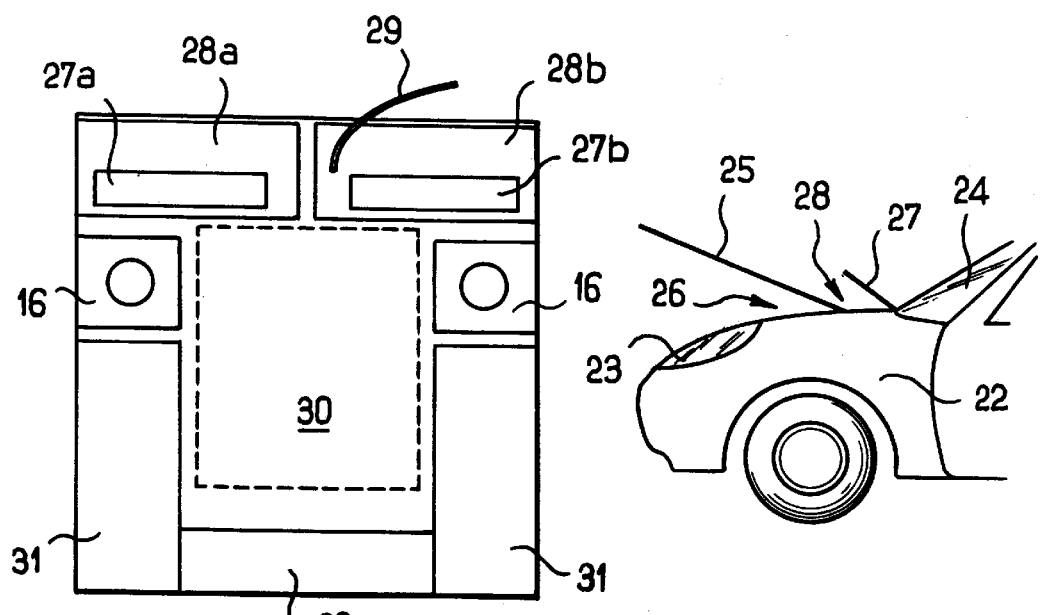
FIG_9A
FIG_9B

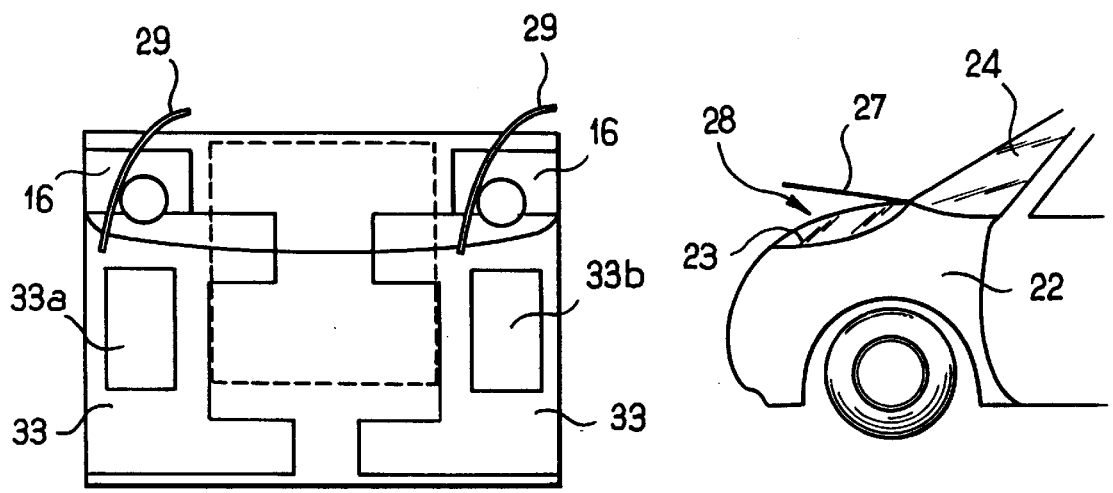
FIG._12A  FIG._12B
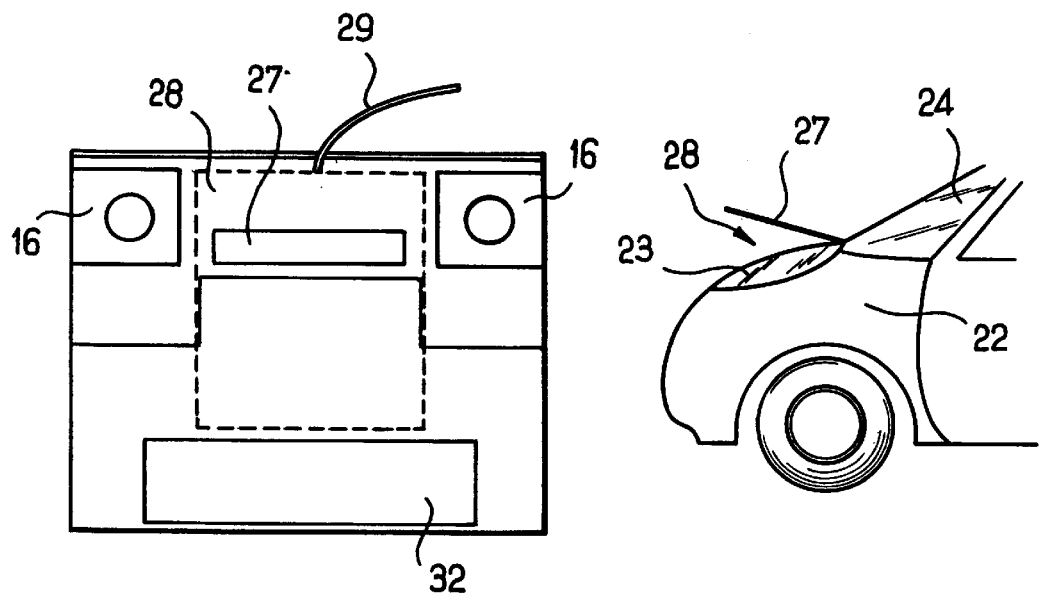
FIG._13A  FIG._13B

SUPPORT PIECE FOR BODYWORK ELEMENTS

The present invention relates to a support piece for bodywork elements.

BACKGROUND OF THE INVENTION

It is known that a motor vehicle is subdivided into at least two compartments, one of which can be referred to as the "front block" and contains the engine, while the other constitutes the cabin of the vehicle.

Inside each compartment, specific support pieces mounted on the chassis of the vehicle or on elements of its bodywork support various items.

Thus, in the engine compartment, along the front fenders (or "wings") of the vehicle there are to be found, in particular, an electric battery, various fluid tanks, electronic controllers, and electrical boxes. Likewise, the optics of the vehicle headlights are generally housed above the bumper.

In addition, each bodywork element is itself supported by the chassis of the vehicle, by means of other support pieces fixed individually on the chassis.

Unfortunately, the presence of these numerous support pieces constitutes a drawback both during vehicle manufacture and during operation thereof.

In order to fix each item individually inside a compartment, it is necessary to act directly on the chassis of the vehicle, thus occupying several stations on the assembly line and making it difficult to reduce manufacturing costs and investment by reducing the number of operations and assembly time.

In addition, the large number of support pieces increases dispersion in manufacture and assembly, thereby making it necessary when assembling bodywork elements to perform numerous adjustments in order to reduce the fitting clearances between the elements.

Also, if in use the vehicle should be subject to a shock against an obstacle, then the deformation of the bodywork elements concerned and the damage to the items housed in the vicinity of the bodywork elements are difficult to contain, giving rise to a problem associated with the cost of the necessary repairs, which can be very high.

OBJECTS AND SUMMARY OF THE INVENTION

The present invention seeks to solve those drawbacks by proposing a support piece for bodywork elements, which piece is also particularly simple and of low cost.

The present invention provides a support piece for bodywork elements, the support piece being designed to be fixed to the chassis of a motor vehicle and to be placed beside a compartment of the motor vehicle, the support piece presenting, adjacent to the bodywork elements, a reinforced structure whose envelope is suitable for matching substantially the inside shape of the bodywork elements for support purposes, and adjacent to the compartment, arrangements for receiving items that are designed to be housed inside said compartment.

The term "inside shape of a bodywork element" is used to designate the shape of its face that faces towards the inside of the vehicle, i.e. the face opposite from the face of the bodywork element that is visible from the outside of the vehicle.

Preferably, the support piece of the invention is made as a single piece.

Otherwise, the support piece can be obtained by assembling together as small a number as possible of subassemblies.

By means of the support piece of the invention, it is possible to eliminate nearly all of the traditional support pieces used in manufacturing a vehicle, whether for supporting bodywork elements or for holding items inside a vehicle compartment.

Thus, during vehicle manufacture, it is possible to install on the support piece all of the items that are to take their places inside the compartment, and this can be done, for example, off the assembly line for the vehicle proper. As a result, investment is reduced and time is saved on the assembly stations during manufacture of the vehicle.

Thereafter, it suffices to put the fully-equipped support piece onto the chassis of the vehicle and then to proceed with making the various connections that are required.

In a particular embodiment, on its compartment side, the support piece has arrangements that form integral parts of the items housed in the compartment.

Thus, the support piece may include integrally the housing of an optical block, with the glass of the block being secured to the associated bodywork element, or it may include a receptacle constituting a tank for a liquid, a fuse box, a housing for a controller, or a duct for an air filter, or it may comprise the bottom portion of an air duct.

Advantageously, the items are grouped together into functional systems such as the windshield wiper system, the lighting system, or the electrical and electronic systems, with these systems being shared among the support pieces, thereby making it possible to limit the number of cables that need to pass through the engine compartment.

In a particular embodiment, the vehicle bodywork elements are defined by the boundaries of the support pieces. Thus, it is possible for each support piece to be put into place on the vehicle chassis while fitted not only with all of its inside items, but also while covered by the corresponding bodywork element.

Adjacent bodywork elements are connected together and fitted relative to each other by the support pieces which may, in particular, include edges with sloping bearing surfaces which, in the event of the support pieces moving relative to one another due to a shock, cause the bodywork elements to slide relative to one another, thereby reducing the stresses that result from such displacement in order to preserve the support pieces and the bodywork elements that are not directly impacted during the shock.

Because the support piece of the invention is integrally formed or is built up from as small a number as possible of subassemblies it provides the additional advantage whereby it is possible to determine in advance how the support piece will deform in the event of a shock against an obstacle.

Thus, in a preferred embodiment of the invention, the support piece has differing degrees of stiffness between different portions thereof so that in the event of a shock against an obstacle, the support piece deforms keeping the items it supports continuously set back from the obstacle, with the energy of the shock being absorbed in zones designed for that purpose, which zones can be reversibly deformable or fusible, thus limiting intrusion of the obstacle.

In addition, in order to safeguard not only the equipment items mounted on the support piece of the invention, but also the support piece itself, provision is made in a particular embodiment for the support piece to have fusible fixings which, in the event of a shock, give way before the support piece itself breaks, thus enabling the support piece to move relative to the chassis of the vehicle and putting the chassis, or absorber elements situated between the chassis and the obstacle, directly into contact with the obstacle.

Also, because of its structure, the support piece of the invention provides excellent mechanical strength and gives support to the bodywork elements it carries, not only via their peripheries, but also over the surface areas thereof.

This advantage is of particular interest for bodywork elements made of plastics material, which are often unattractive to the public because they are too easy to deform by exerting a small amount of pressure on the outside surface thereof.

The support piece of the invention is preferably designed to be positioned on one side of the vehicle, at the front.

In a first embodiment, the support piece is suitable for occupying a corner, and in particular a front corner, of the vehicle.

In a second embodiment, the support piece is suitable for occupying the space that extends between a wheel, and in particular a front wheel, and the cabin of the vehicle.

In a third embodiment, the support piece extends as far as the vertical longitudinal midplane of the vehicle.

It may be observed that it is particularly advantageous to use a version of the support piece of the invention in which the support piece occupies one of the front corners of the vehicle, since, specifically speaking, shocks occur most frequently at the front corners of vehicles.

Thus, in most cases, after a significant shock, only the support piece and possibly the associated elements of bodywork need to be replaced, and that is advantageous from the cost point of view.

Advantageously, the support piece of the invention includes link means, either integral or added-on, for linking adjacent bodywork elements together, for example the fender and the bumper of the vehicle, preferably in the vicinity of the optical systems of the vehicle headlights, thereby linking those two bodywork elements together and also, in some cases, controlling fitting clearances and allowing for differential expansion between bodywork elements.

In an advantageous embodiment, the support piece of the invention is made of plastics material, e.g. glass-fiber-filled polypropylene.

Other materials can be used, for example glass-fiber-filled terephthalate polyethylene, or the material known as styrene methyl acrylate (SMA), or out of polyamide.

It is also possible to use common thermoplastic or thermosetting synthetic materials, or recycled materials, reinforced with organic or inorganic fibers, that may optionally be woven.

With a single set of manufacturing tooling, it is possible to make provision for using several different materials for making up the same support piece so as to optimize matching it to various different requirements such as withstanding the climatic conditions in which the vehicle is to be used, and economical considerations such as cost and investment.

It is also possible to make the support piece of the invention from an association of materials selected to increase the stiffness of the support piece and to provide good control over differential expansion between bodywork elements, either because the elements are of different kinds, or because they are made of plastics material but with coefficients of expansion that are not identical.

Other advantages appear on reading the following description, in addition to the advantages associated with the fact that the support piece of the invention is low cost, lightweight, and recyclable.

BRIEF DESCRIPTION OF THE DRAWINGS

In order to make the invention better understood, there follows a description of embodiments given as non-limiting examples with reference to the accompanying drawings, in which:

FIG. 5b is a section view on line Vb—Vb of FIG. 5a;

FIG. 6 is a perspective view of a front left support piece constituting a fourth embodiment of the invention;

FIG. 7 is a perspective view of a front left support piece constituting a fifth embodiment of the invention; and FIGS. 8A, 8B to 14A, 14B show various distributions of support pieces of the invention together with the items they contain.

MORE DETAILED DESCRIPTION

The various embodiments described below can naturally be converted into right support pieces, symmetrically or otherwise, and they can support other bodywork elements and they can support or constitute other items.

Likewise, support pieces of the invention can be situated at other locations of a vehicle, and in particular they can be located at the rear end thereof.

Figure 1:
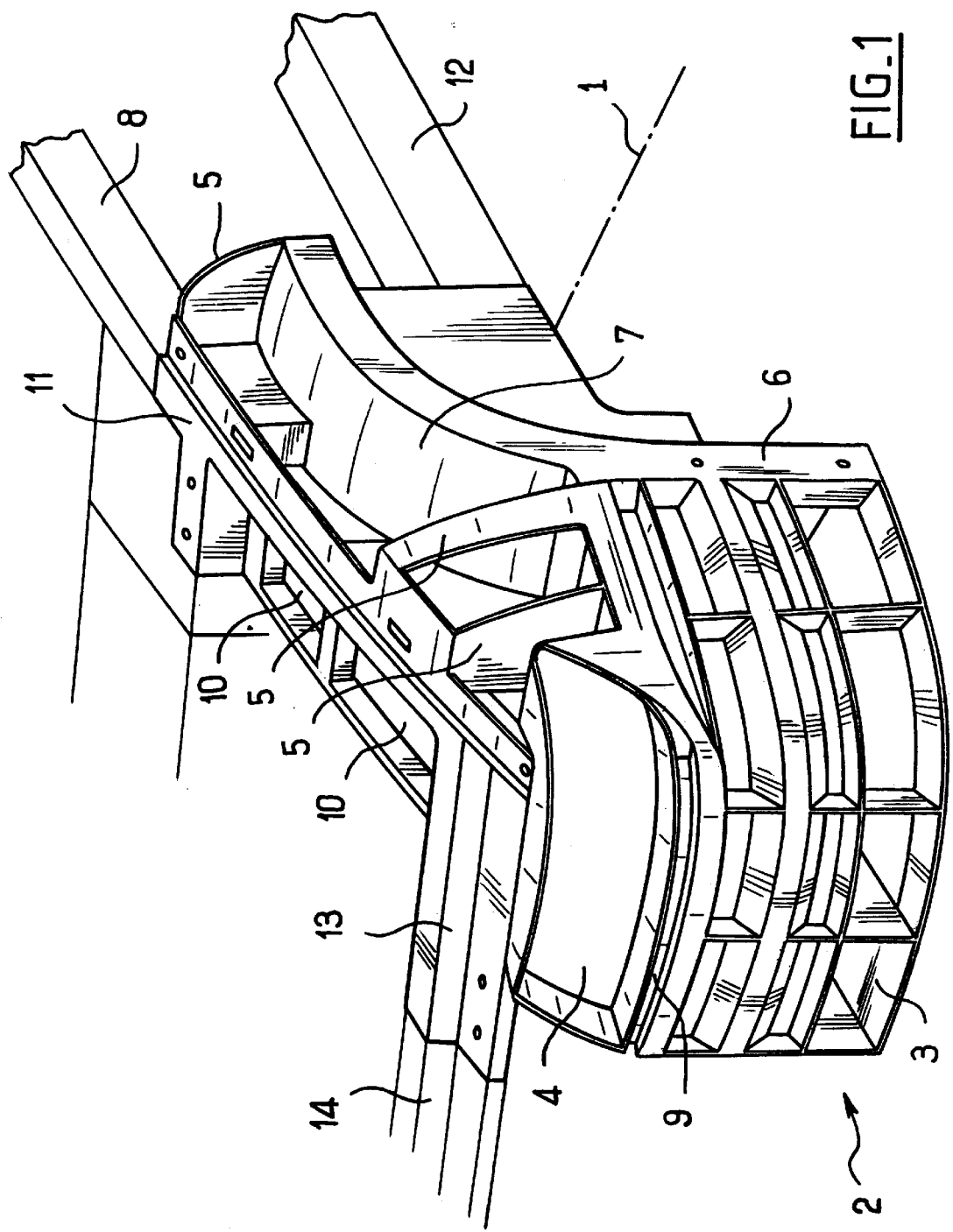
FIG. 1 is a perspective view of a front left support piece constituting a first embodiment of the invention.

The support piece of FIG. 1 is made of plastics material, e.g. glass-fiber-filled polypropylene.

In this first embodiment, the support piece, also referred to as a "front quarter", extends from the axis 1 of the front wheels of the vehicle, covering the front left corner of the vehicle, and coming to an end along the inside edge of the optical system of the vehicle headlights. It is designed to support the front left fender of the vehicle and one end of the bumper (neither of which is shown).

The support piece comprises a structure which is partitioned in its bottom portion, which portion constitutes its impact zone 2 corresponding to the location of the bumper and behind which it is possible to install energy-absorbing elements which may be reversible or otherwise, or which may be fusible.

One of the openings 3 of this partitioned structure 2 can be used as an air duct, e.g. to cool the front wheel brakes.

Above the impact zone 2, the support piece includes an opening 4 for the optical system of the vehicle headlights, and set back from this opening, it has ribs 5 for pressing against the inside face of the front fender of the vehicle, which fender may, for example, be fixed to the support piece along the edge 6 of a wheelarch-forming portion 7 of the support piece, and along a top longitudinally-extending member 8 of the vehicle chassis.

In a variant (not shown) the support piece includes an integrated housing integrally formed therewith and constituting the housing of the optical block.

Immediately beneath the opening 4 for the headlight optical systems, a horizontal groove 9 serves to receive the bumper and the fender so as to hold them together and/or fit them relative to each other.

On its inside face, i.e. its face looking into the engine compartment of the vehicle, the support piece has arrangements 10 for receiving, for example, a fluid tank, an electric battery, and other items which are conventionally fixed inside the engine compartment in the vicinity of the front fender of the vehicle.

These arrangements could also directly constitute the fluid tank and the battery case, so as to avoid having the support piece acting merely as an outer shell for containing separate containers, since it can itself directly constitute such containers.

This serves firstly to simplify assembly since there is no longer any need to provide fixing means to hold the items concerned, and secondly it provides a non-negligible saving in weight.

For assembly purposes, the support piece includes bearing zones 11 which bear on the top and bottom longitudinally-extending members 8 and 12 of the vehicle chassis, and also a bearing zone 13 for fixing to a cross-member 14 uniting the two support pieces situated at the front of the vehicle.

It can be seen that the support piece in this embodiment makes it possible to omit all of the support pieces, and in particular those having sliding fixings, that would otherwise be necessary for holding in conventional manner the front fender of the vehicle, the end of its bumper, the optical systems of the headlights, the fluid tank, and the electric battery.

By omitting all of these support pieces, it becomes possible for the assembly constituted by the bumper, the front fender, and the optical systems of the headlights to expand forwards, while leaving the fitting clearances between them unaffected.

The stiffness of the support piece is distributed non-uniformly between its impact zone 2, constituted by its bottom portion that corresponds to the bumper, and its zones including the arrangements 10 constituted by the top portion thereof.

Thus, the impact zone 2 is reinforced so as to be able to withstand shocks between the corner and an obstacle, and to absorb such shocks, while the top portion of the support piece deforms under such circumstances, thereby enabling the optical systems of the headlights together with the items housed inside the compartment to move away from the obstacle, and thus protecting them from damage.

In other words, the way in which the support piece deforms in the event of a shock is programmed by its structure.

For the same purpose, the zones 11 that bear against the longitudinally-extending members 8 and 12 of the vehicle chassis are fusible, i.e. in the event of a shock involving more than a certain amount of energy, they break like fuses, and this happens before the support piece itself becomes damaged.

Because the support piece of the invention is made of plastics material, its coefficient of expansion is quite close to that of bodywork elements that are made of plastics material.

That is why the support piece of the invention makes it possible to accommodate a portion of the differential expansion that exists between the chassis of the vehicle and the bodywork elements made of plastics material.

Figure 2:
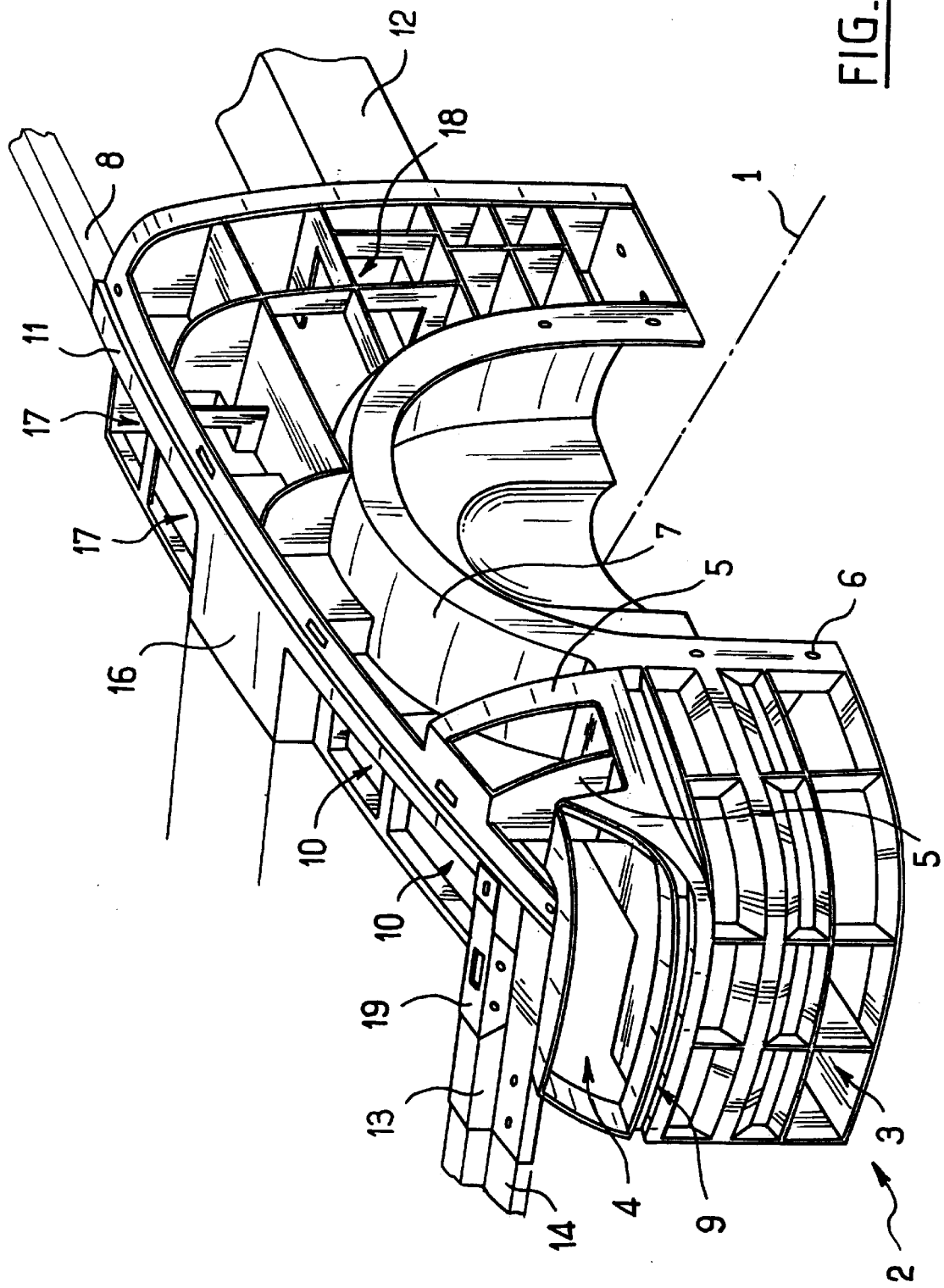
FIG. 2 is a perspective view of a front left support piece constituting a second embodiment of the invention.

In the embodiment of FIG. 2, the support piece extends from the front door of the vehicle to the inside edges of the optical systems of the headlights.

Figure 3:
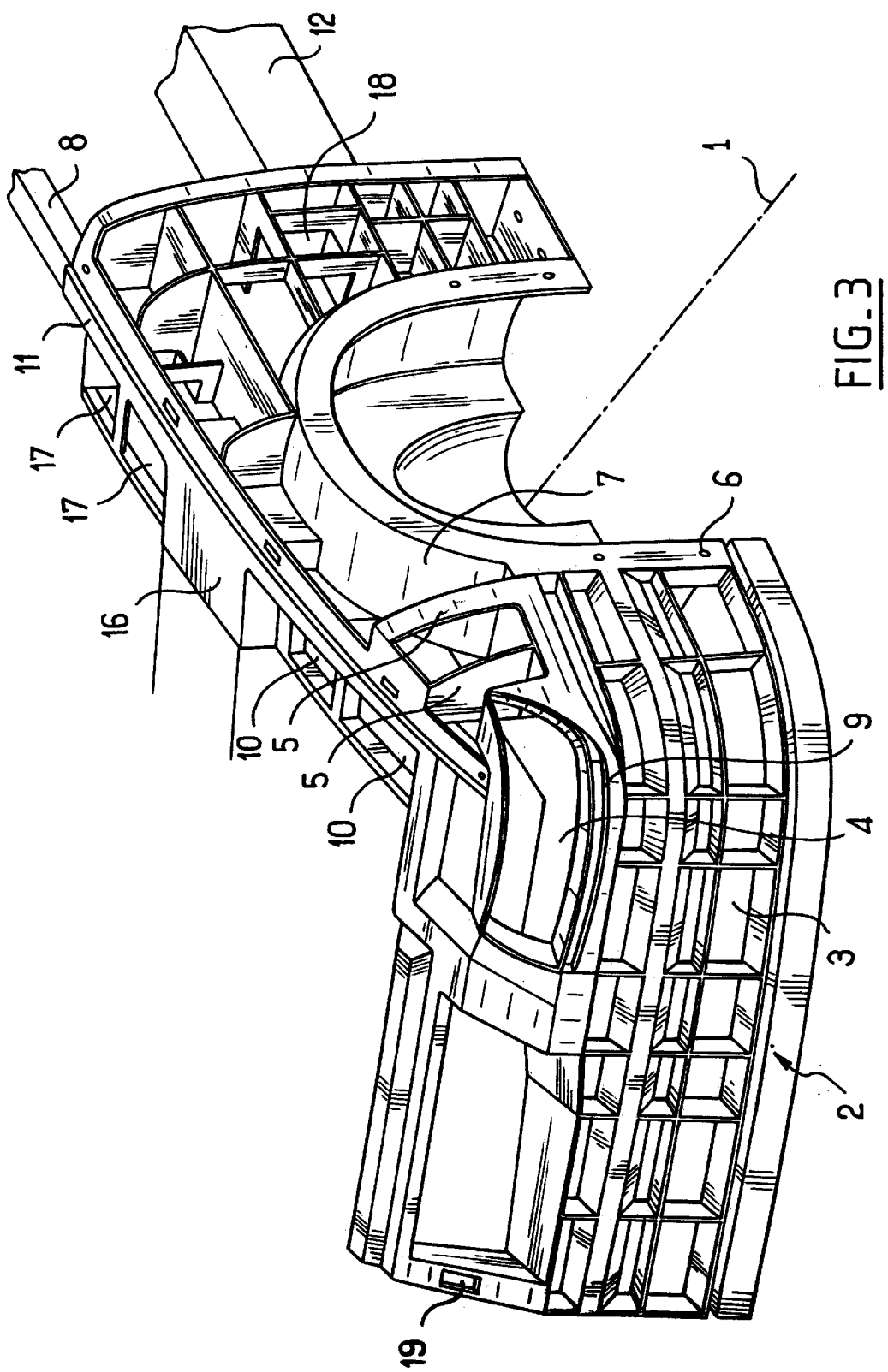
FIG. 3 is a perspective view of a front left support piece constituting a third embodiment of the invention.
Figure 4:
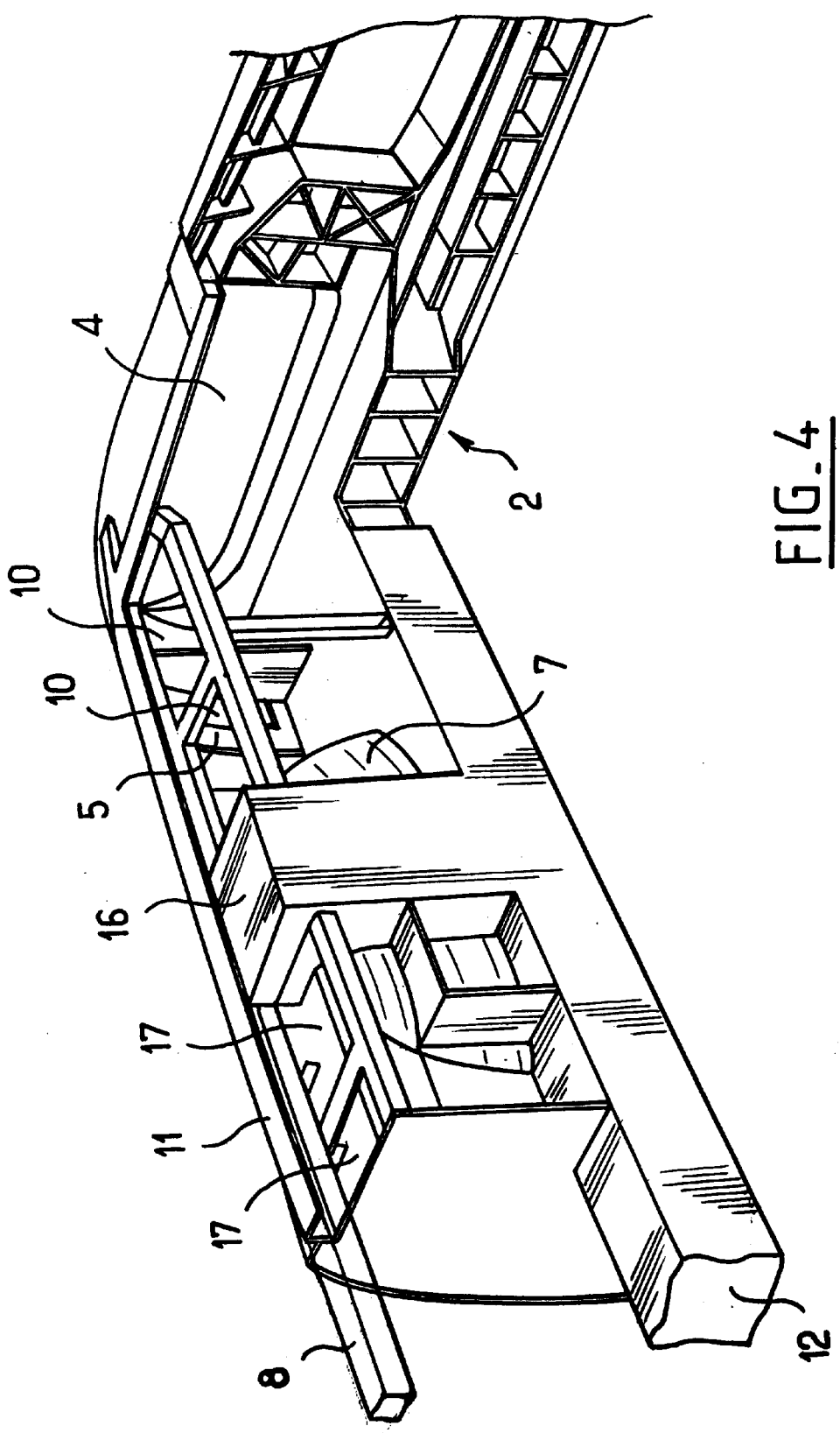
FIG. 4 is a perspective view of the inside of the FIG. 3 support piece.

In the embodiment of FIG. 3, it extends to the vicinity of the vertical longitudinal midplane of the vehicle.

These support pieces can be used to position the fender, the hood (or "bonnet"), and the cowl (or "scuttle") of the vehicle relative to one another, and it also serves to position the fender relative to the bumper.

Additional housings 17 are provided adjacent to the engine compartment, on either side of the shock absorber hump 16.

Other housings 18 are provided, for example to receive the filters of a vehicle air conditioner system.

In addition to the housings and ducts described above, it is also possible to provide cable-fixing systems or paths in the support piece to facilitate the routing of electrical conductors and optionally of optical conductors through and around the engine compartment.

In the embodiment of FIG. 2, it can be seen that the zone 13 for connection to the cross-member 14 which extends between the two support pieces at the front of the vehicle includes a metal insert 19 forming a lock and/or a safety catch for the hood.

In the embodiment of FIG. 3, the metal insert 19 is placed at the front end of the support piece, in the vicinity of the vertical longitudinal midplane of the vehicle.

In this version, the support piece is secured to the dash panel 20 of the vehicle, i.e. the panel separating the cabin from the engine compartment.

Figure 5A:
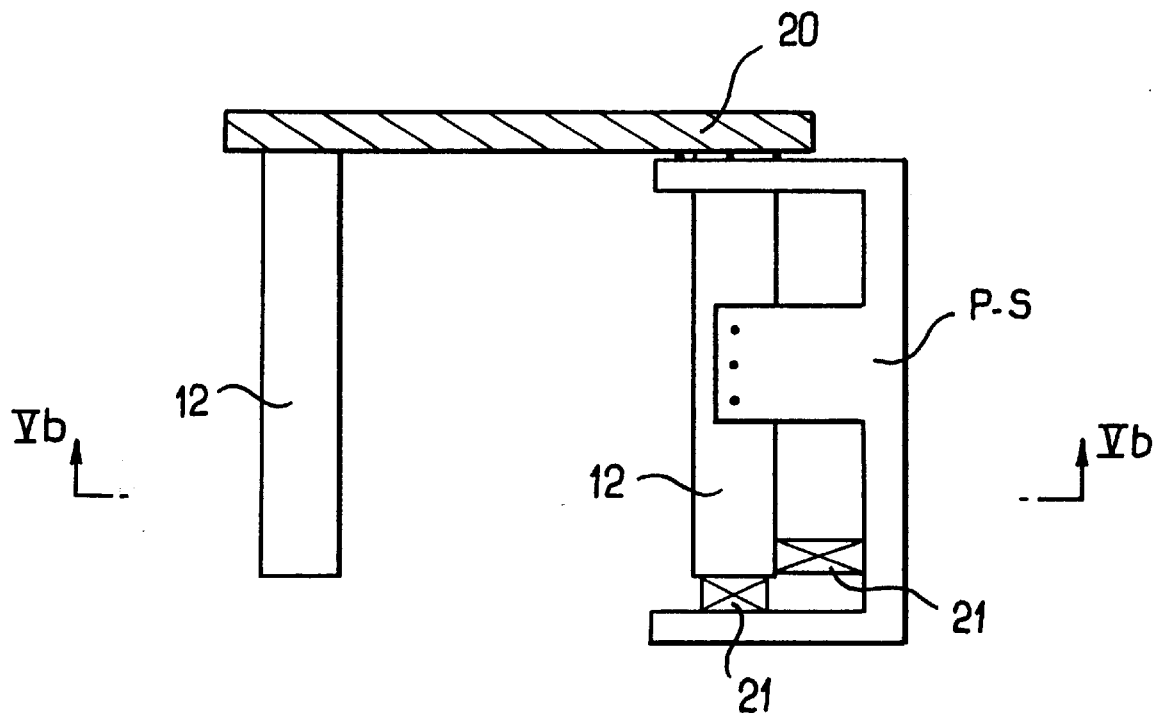
FIG. 5a is a diagrammatic view from above the vehicle showing the points where the FIG. 3 support piece bears against the vehicle chassis.
Figure 5B:
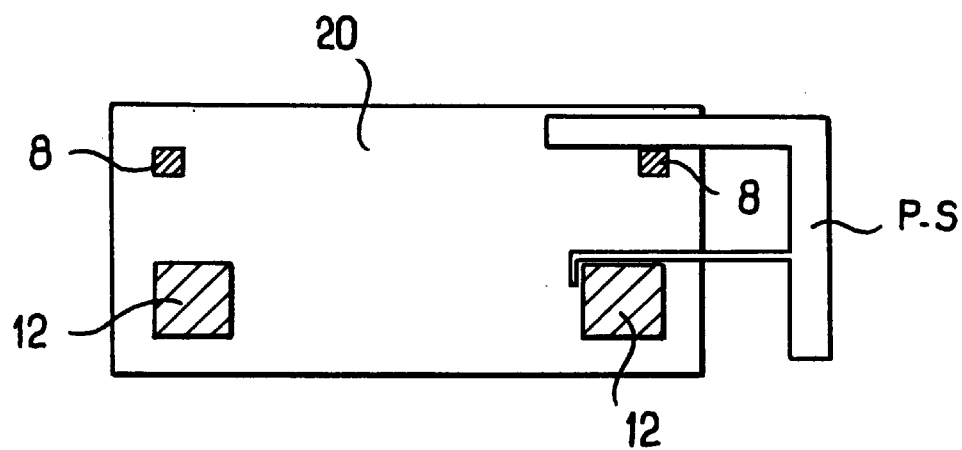

FIGS. 5*a* and 5*b* constitute a diagram showing the fixing points of the support piece (referenced P-S in the figure) relative to the dash panel and to the longitudinally-extending items of the vehicle chassis.

In particular, it can be seen that at the front and beside the lower longitudinally-extending member 12, there are provided energy absorber elements 21, which may be reversible or fusible, and which are suitable for transmitting to the lower longitudinally-extending member 12 the energy of a shock received by the bumper and/or by the cross-member and transmitted via the impact zone of the support piece.

In the embodiment of FIG. 6, the support piece extends from the front door of the vehicle to a region situated immediately behind the corner of the vehicle.

In this embodiment, the support piece of the invention has the advantage of being capable of adapting to traditional bodywork elements that do not cover the corners of the vehicle.

This embodiment also makes use of various portions of the support piece of FIG. 3.

In the embodiment of FIG. 7, the support piece extends from the axis of the front wheels to the vertical longitudinal midplane of the vehicle.

Each of the following figures comprises an elevation view 8A to 14B of the front of a vehicle together with a diagrammatic plan view of the front of the vehicle.

In the elevation views 8B to 14B, there can be seen the front left fender 22, an optical block 23, the windshield 24, the hood 25 of the engine compartment 26, and a trap-door 27 for the cowl 28.

The cowl is situated behind the engine compartment, at the bottom of the windshield. It may be constituted by a support piece of the invention, supporting items that are made accessible via the trap-door.

In the plan views 8A to 14A, there are also shown the humps 16 over the shock absorbers, the windshield wipers 29, and the engine unit 30.

In the embodiment of FIGS. 8A and 8B, the engine compartment has two front quarters 31 of the type shown in FIG. 1, a front face 32, and a cowl 28 fitted with a trap-door 27.

Table I specifies how items are distributed amongst the various support pieces.

In the embodiment of FIGS. 9A and 9B, the cowl is subdivided into two sub-cowls 28a and 28b, each provided with its own trap-door 27a or 27b, and the items are distributed differently.

Table II specifies how items are distributed amongst the various support pieces.

Figures 10A, 10B:
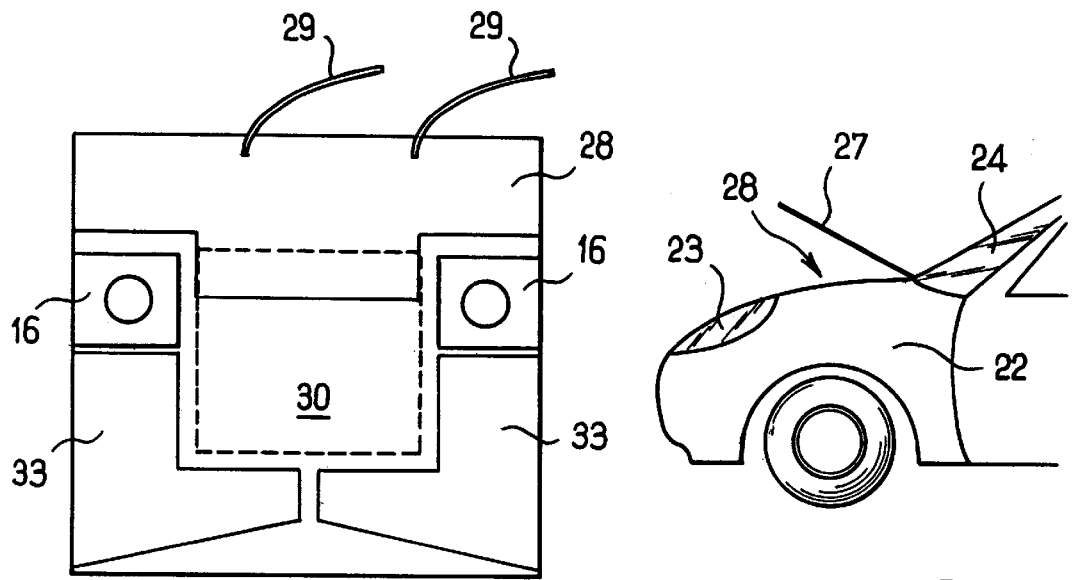

In the embodiment of FIGS. 10A and 10B, the engine compartment 26 comprises two side blocks 33 which extend in front up to the vicinity of the vertical longitudinal midplane of the vehicle, like the blocks shown in FIG. 3, and it has a cowl 28 provided with a trap-door 27 which constitutes the only opening leading to the engine compartment, given that the hood is removable, but not provided with hinges.

Table III specifies how items are distributed amongst the various support pieces.

Figures 11A, 11B:
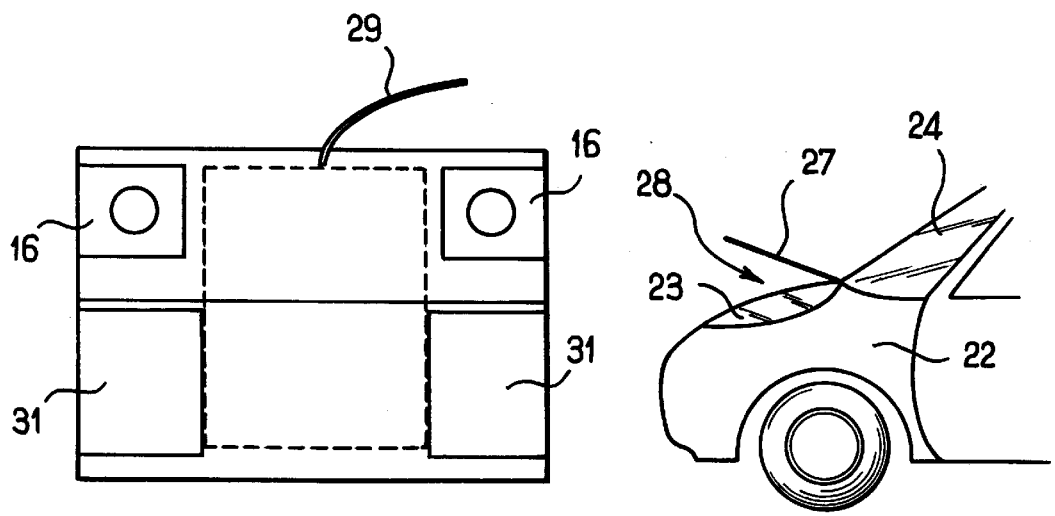

In the embodiment of FIGS. 11A and 11B, the engine compartment 26 is smaller and the above two side blocks are replaced by front quarters 31. This is for an urban type vehicle.

As before, the trap-door 27 of the cowl 28 constitutes the only opening item, and again the engine hood is dismountable only.

Table IV specifies how items are distributed amongst the various support pieces.

In the embodiment of FIGS. 12A and 12B, corresponding to a people-carrier type vehicle, only two side blocks 33 are provided, each having its own trap-door 33a or 33b, and the engine hood is, yet again, dismountable only. It will be observed that the windshield 24 extends forwards of the shock absorber humps 16.

Table V specifies how items are distributed amongst the various support pieces.

In the embodiment of FIGS. 13A and 13B, the engine compartment comprises only a front face 32 and a cowl 28 fitted with a trap-door 27, the engine hood being dismountable only.

Table VI specifies how items are distributed amongst the various support pieces.

Figures 14A, 14B:
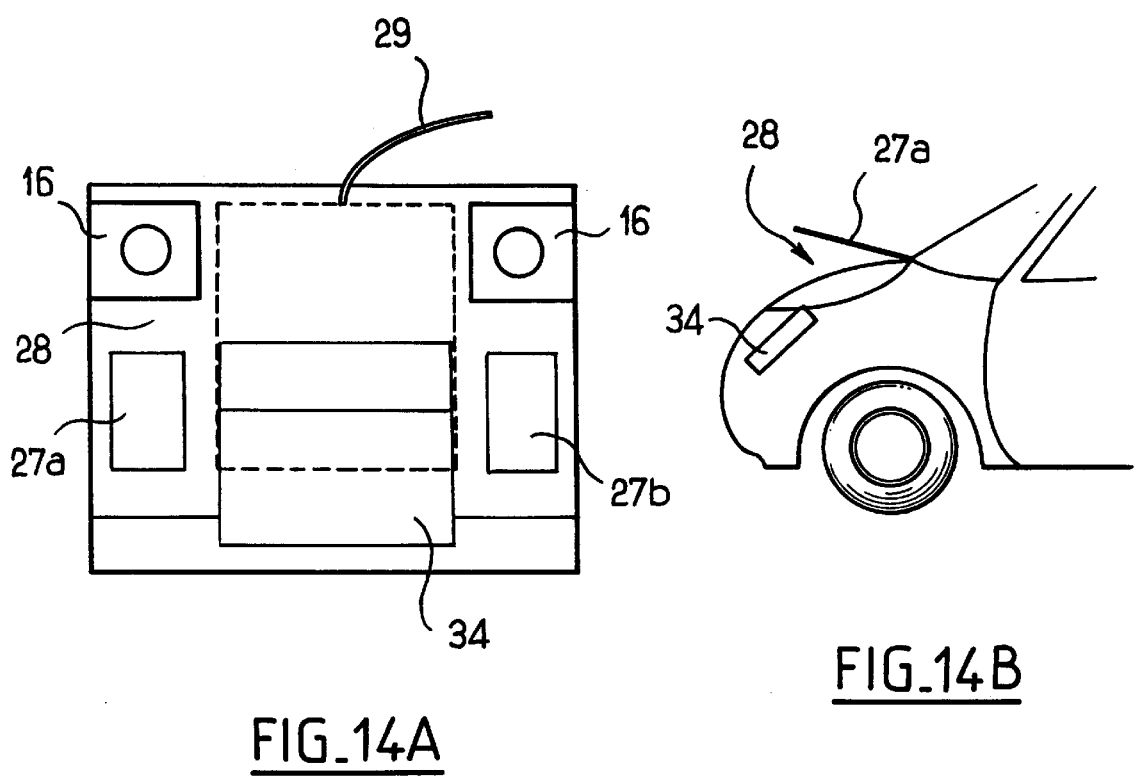

Finally, in the embodiment of FIGS. 14A and 14B, a cowl 28 provided with two trap-doors 27a and 27b extend over the sides of the engine compartment and a cooling cassette 34 is provided in front.

Table VII specifies how items are distributed amongst the various support pieces.

Naturally, the embodiments described above are not limiting in any way and any desirable modifications may be made thereto without thereby going beyond the ambit of the invention.

TABLE I

| COWL CASSETTE | FRONT RIGHT QUARTER | FRONT FACE |
|---|---|---|
| Windshield wiper system | Right light system | Cooling system |
| | Front right optical unit | Radiator |
| Windshield washer tank Access/trap-door | Flashers and dashboard indicators | Condenser Fan and motor unit |
| Headlight washer tank Access/trap-door | Harnesses Relays | Pipes Expansion chamber |
| Pumps | Headlight washer nozzle | Access system |
| Windshield wiper motor Gear unit | Headlight washer subsystem | 1 × hood lock 2 × hook abutments |
| Wiper transmission | Cooling system | Hood prop |
| 2 × wiper supports | Gear box oil radiator | Opening control cable |
| Electronics and electrical systems | Fluid tank for power-steering | Gasket |
| Battery Access/trap-door | Horn Gasket | |
| Fuse box Injection controller Electrical harnesses Connectors | | |

| COWL GRILLE | LEFT FRONT QUARTER | |
|---|---|---|
| 2 × washer nozzles | Left light system | |
| Pipes | Front left optical unit | |
| Gasket | Flashers and dashboard indicators | |
| | Harnesses | |
| | Relays | |
| | Headlight washer nozzle | |
| | Cooling system | |
| | Turbo heat exchanger | |
| | Filter system | |
| | Engine air filter | |
| | Gasket | |

TABLE II

| RIGHT HALF COWL | RIGHT FRONT QUARTER | FRONT FACE |
|---|---|---|
| Windshield wiper system | Right light system | Cooling system |
| | Front right optical unit | Radiator |
| Windshield washer tank Access/trap-door | Flashers and dashboard indicators | Condenser Fan and motor unit |

TABLE II-continued

| | | |
|---|---|---|
| Washer pump | Harnesses | Expansion chamber |
| Windshield wiper motor | Relays | Pipes |
| Gear unit | Headlight washer | Access system |
| Wiper transmission | subsystem | 1 × hood lock |
| 1 × wiper supports | Headlight washer nozzle | 2 × hood abutments |
| 1 × washer nozzles | Cooling System | Hood prop |
| Pipes | Gear box heat exchanger | Opening control cable |
| Filter system | | |
| Pollen filter | | Fluid tank for power-steering |
| Storage spaces | | |
| Access/trap-door | | Horn |
| Access system | | Gasket |
| Hood hinges | | |

| LEFT HALF COWL | FRONT LEFT QUARTER |
|---|---|
| Electronics and electrical systems | Left light system |
| | Front left optical unit |
| Battery | Flashers and dashboard indicators |
| Fuse box | |
| Access/trap-door | Harnesses |
| Injection controller | Relays |
| Harnesses | Headlight washer nozzle |
| Horn | Turbo heat exchanger |
| Connectors | Engine air filter |
| Access system | ABS controller |
| Hood Hinges | |

TABLE III

| COWL | RIGHT HALF COWL |
|---|---|
| Windshield wiper system | Right light system |
| Windshield washer tank | Front right optical unit |
| Washer pump | Flashers and dashboard indictors |
| Windshield wiper motor | Harnesses |
| Gear unit | Relays |
| Wiper transmission | Headlight washer tank |
| 2 × wiper supports | Headlight washer nozzle |
| 2 × washer nozzles | Cooling system |
| Pipes | Radiator |
| Electronics and electrical systems | Fan and motor unit |
| | Expansion chamber |
| Battery | Gear box heat exchanger |
| Fuse box | Pipes |
| Injector and ABS controllers | Fluid tank for power-steering |
| Harnesses | Gasket |
| Connectors | |
| Horn | |
| Access system | |
| 1 × cowl lock | |
| Cowl hinges | |
| Cowl prop | |
| Opening control cable | |
| Filter system | |
| Pollen filter | |
| Engine air filter | |

| LEFT HALF COWL |
|---|
| Left light system |
| Front left optical unit |
| Flashers and dashboard indicators |
| Harnesses |
| Relays |
| Headlight washer nozzle |
| Cooling system |
| Condenser |
| Fan and motor unit |
| Turbo heat exchanger |
| Pipes |
| Gasket |

TABLE IV

| COWL | FRONT RIGHT QUARTER | FRONT LEFT QUARTER |
|---|---|---|
| Windshield wiper system | Cooling system | Cooling System |
| Windshield washer tank | Radiator | Condenser |
| Washer pumps | Turbine | Turbine |
| Windshield wiper motor | Expansion chamber | Turbo heat exchanger |
| Gear unit | Gear box heat exchanger | Pipes |
| Wiper transmission | Pipes | Filter system |
| 2 × wiper supports | Electronics and electrical systems | Pollen filter |
| 2 × washer nozzles | | |
| Pipes | Injection controller | ABS controller |
| Electronics and electrical systems | Harnesses | |
| | Connectors | |
| Battery | Horn | |
| Fuse box | | |
| Access system | | |
| 1 × cowl lock | | |
| Cowl hinges | | |
| Cowl prop | | |
| Opening control cable | | |
| Filter system | | |
| Pollen filter | | |
| Storage spaces | | |
| Right/left light systems | | |
| Front right/left optical units | | |
| Flashers and dashboard indicators | | |
| Harnesses | | |
| Relays | | |
| Headlight washer subsystem | | |
| Headlight washer nozzle | | |
| Gasket | | |

TABLE V

| RIGHT SIDE HALF | |
| --- | --- |
| Windshield wiper system | Cooling system |
| | Condenser |
| Windshield washer tank | Turbine |
| Access/trap-door | Expansion chamber |
| Washer pumps | Pipes |
| Windshield wiper motor | Gear box heat exchanger |
| Gear unit | Filter system |
| Wiper transmission | Pollen filter |
| 2 × wiper supports | Storage spaces |
| 2 × washer nozzles | Gasket |
| Pipes | |
| Right light system | |
| Front right optical unit | |
| Flashers and dashboard indicators | |
| Harnesses | |
| Relays | |
| Headlight washer subsystem | |

| LEFT SIDE HALF | |
| --- | --- |
| Electronics and electrical systems | Cooling system |
| | Radiator |
| Battery | Turbine |
| Fuse box | Expansion chamber |
| Access/trap-door | Gear box heat exchanger |
| Injection controller | Pipes |
| ABS controller | Turbo heat exchanger |
| Harnesses | Filter system |
| Horn | Engine air filter |
| Left light system | |
| Front left optical unit | |
| Flashers and dashboard indicators | |
| Harnesses | |
| Relays | |
| Headlight washer nozzle | |
| Gasket | |

TABLE VI

| COWL | FRONT FACE |
| --- | --- |
| Windshield wiper system | Cooling system |
| Windshield washer tank | Radiator |
| Washer pump | Condenser |
| Windshield wiper motor | Fan and motor unit |
| Gear unit | Expansion chamber |
| Wiper transmission | Turbo heat exchanger |
| 2 × wiper supports | Pipes |
| 2 × washer nozzles | Electronics and electrical systems |
| Pipes | Battery |
| Right/left light systems | Fuse box |
| Front right/left optical units | Injection and ABS controllers |
| Flashers and dashboard indicators | Harnesses |
| Harnesses | Connectors |
| | Horn |
| Relays | Filter system |
| Headlight washer subsystem | Engine air filter |
| Headlight washer nozzle | Gasket |
| Access system | |
| 1 × cowl lock | |
| Cowl hinges | |
| Cowl retainer | |
| Opening control cable | |
| Filter system | |
| Pollen filter | |
| Storage spaces | |

TABLE VII

| COWL | COOLING CASSETTE |
| --- | --- |
| Windshield wiper system | Cooling system |
| Windshield washer tank | Radiator |
| Washer pump | Condenser |
| Windshield wiper motor | Fan and motor unit |
| Gear unit | Expansion chamber |
| Wiper transmission | Gear box heat exchanger |
| 2 × wiper supports | Turbo heat exchanger |
| 2 × washer nozzles | Pipes |
| Pipes | Integrated in the radiator grill |
| Right/left light systems | |
| Front right/left optical units | |
| Flashers and dashboard indicators | |
| Harnesses | |
| Relays | |
| Headlight washer subsystem | |
| Headlight washer nozzle | |
| Access system | |
| 1 × cowl lock | |
| Cowl hinges | |
| Cowl prop | |
| Opening control cable | |
| Electronics and electrical systems | |
| Battery | |
| Fuse box | |
| Injection and ABS controllers | |
| Harnesses | |
| Connectors | |
| Horn | |
| Filter system | |
| Engine air filter | |
| Pollen filter | |
| Storage spaces | |
| Gasket | |

What is claimed is:

1. A support piece for bodywork elements of a motor vehicle, the support piece being fixed to a chassis of the motor vehicle and placed on a lateral side of a compartment of said motor vehicle, the support piece comprising: a reinforced structure including an envelope having a shape matching substantially inside shapes of the bodywork elements for supporting the bodywork elements, and arrangements adjacent to the compartment for receiving items that are housed inside said compartment, wherein the support piece defines a corner of the motor vehicle and extends over at least a part of a wheel of the motor vehicle.

2. A support piece according to claim 1, wherein the support piece is formed as a single piece.

3. A support piece according to claim 1, wherein the support piece is formed of a plurality of pieces that are assembled together.

4. A support piece according to claim 1, further comprising link means for linking together a fender and a bumper of the motor vehicle.

5. A support piece according to claim 4, wherein the link means allows for fitting clearances and for differential expansion of the fender and the bumper.

6. A support piece according to claim 1, wherein the support piece is formed of plastic material.

7. A support piece according to claim 1, wherein the support piece is formed of a plurality of materials, each material selected to increase the stiffness of the support piece and to enable differential expansion between bodywork elements to be accommodated.

8. A support piece according to claim 1, wherein the support piece includes different stiffnesses in different portions so that in the event of a shock against an obstacle, the support piece deforms while holding the items continuously away from the obstacle.

9. A support piece according to claim 1, further including fusible fixings that, in the event of a shock against an obstacle, break before said support piece breaks, thereby enabling the support piece to move relative to the vehicle chassis and allowing said chassis to come directly into contact with the obstacle.

10. A support piece according to claim 1, wherein the support piece is extended to occupy a space between the wheel and a cabin of the motor vehicle.

11. A support piece according to claim 10, wherein the support piece extends to the vertical longitudinal midplane of the vehicle.

12. A support piece according to claim 1, wherein the items belong to a common functional system.

13. A support piece according to claim 1, wherein the corner is a front corner.

14. A support piece according to claim 1, wherein the corner is a rear corner.

15. A support piece according to claim 1, wherein the wheel is a front wheel.

16. A support piece according to claim 1, wherein the wheel is a rear wheel.

17. A support piece according to claim 1, wherein the compartment is a front block.

18. A support piece according to claim 4, wherein the bumper is a front bumper.

19. A support piece according to claim 4, wherein the bumper is a rear bumper.

20. A support piece according to claim 10, wherein the wheel is a front wheel.

21. A support piece according to claim 10, wherein the wheel is a rear wheel.

* * * * *

UNITED STATES PATENT AND TRADEMARK OFFICE
CERTIFICATE OF CORRECTION

PATENT NO. : 6,237,990 B1
DATED : May 29, 2001
INVENTOR(S) : Pascal Barbier et al.

It is certified that error appears in the above-identified patent and that said Letters Patent is hereby corrected as shown below:

Title page,
Item [73] Assignee: change "Lyons" to -- Lyon --.

Column 12, claim 1,
Line 63, change "arc" to -- are --.

Signed and Sealed this

Second Day of April, 2002

Attest:

JAMES E. ROGAN
Attesting Officer
Director of the United States Patent and Trademark Office